(12) United States Patent
Menge (10) Patent No.: US 8,405,020 B2
(45) Date of Patent: Mar. 26, 2013

(54) SCINTILLATOR AND DETECTOR ASSEMBLY INCLUDING A SINGLE PHOTON AVALANCHE DIODE AND A DEVICE OF A QUENCHING CIRCUIT HAVING A SAME WIDE BAND-GAP SEMICONDUCTOR MATERIAL

(75) Inventor: Peter R. Menge, Chagrin Falls, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 393 days.

(21) Appl. No.: 12/786,209

(22) Filed: May 24, 2010

(65) Prior Publication Data

US 2010/0314531 A1    Dec. 16, 2010

Related U.S. Application Data

(60) Provisional application No. 61/185,855, filed on Jun. 10, 2009.

(51) Int. Cl.
    *H01L 31/00* (2006.01)
(52) U.S. Cl. .................. 250/214.1; 250/214 R
(58) Field of Classification Search ............. 250/214.1, 250/214 R, 208.1, 370.01–370.15; 438/91, 438/237; 257/186, 438–466
    See application file for complete search history.

(56) References Cited

U.S. PATENT DOCUMENTS

| 3,247,377 A | 4/1966 | Hall, Jr. |
| 4,945,227 A | 7/1990 | Jones et al. |
| 4,963,727 A | 10/1990 | Cova |
| 5,194,727 A | 3/1993 | Johnson et al. |
| 5,847,397 A | 12/1998 | Moustakas |
| 6,541,752 B2 | 4/2003 | Zappa et al. |
| 6,758,326 B1 | 7/2004 | Benjamin |
| 6,768,326 B2 | 7/2004 | Brown et al. |
| 7,011,814 B2 | 3/2006 | Suddarth et al. |
| 7,525,249 B2 | 4/2009 | Suyama et al. |
| 7,714,292 B2 * | 5/2010 | Agarwal et al. .......... 250/370.01 |
| 2004/0245592 A1 | 12/2004 | Harmon et al. |
| 2005/0098844 A1 | 5/2005 | Sandvik et al. |
| 2008/0156993 A1 | 7/2008 | Weinberg et al. |
| 2009/0261263 A1 | 10/2009 | Menge et al. |

OTHER PUBLICATIONS

Hamamatsu Photonics K.K., "Photomultiplier Tubes, Basics and Applications", Feb. 2006 Third Edition, 324 pages.
Angelo J. Alfano, "Hybrid Photomultiplier: Its Characterization and Application As a Wide-Dynamic-Range Photon Detector" Applied Spectroscopy, vol. 52, Issue 2, pp. 303-307, http://www.opticsinfobase.org/abstract.cfm?URI=as-52-2-303, Feb. 21, 2008.
C.M. Rozsa, R. Dayton, P.Raby, M. Kusner, R. Schreiner, "Characteristics of Scintillators for Well Logging to 225degreesC", BicronCorporation, Newbury, Ohio 44065, copyright 1989, Bicron Corporation, Prepared for the IEEE Nuclear Science Symposium, San Francisco, Oct. 1989, Poster No. 5E4, 12 pages.
Buckley, S., et al., "Scalable Geiger/APD/PIN Multi-channel Sensing Platform," Proc. of SPIE: Semiconductor Photodetectors III, vol. 6119, 2006, 10 pgs.

(Continued)

*Primary Examiner* — Que T Le
(74) *Attorney, Agent, or Firm* — Abel Law Group, LLP; Robert T. Conway (57) ABSTRACT

A detector comprising a photodetector including a single photon avalanche diode (SPAD), wherein the SPAD comprises a wide band-gap semiconductor material, and a quenching circuit electrically coupled to the photodetector comprising a first device, wherein the first device comprises a wide band-gap semiconductor material having a band-gap of at least about 1.7 eV at about 26° C.

20 Claims, 3 Drawing Sheets

OTHER PUBLICATIONS

D'Ambrosio et al., "Hybrid photon detector," Nuclear Instruments and Methods in Physics Research A, vol. 201, pp.463-498, published 2003. Retrieved from the Internet [Mar. 29, 2012]; Retrieved from url <http://www.sciencedirect.com/science/arrticle/pii/SO168900203004315>.

Burton, "First principles phase diagram calculations for the wurtzite structure systems AlN-GaN, GaN-InN, and AlN-InN," Journal of Applied Physics, 100, 113528; published Dec. 13, 2006: Retrieved from the internet [Jun. 9, 2011] Retrieved from url <http://authors.library.caltech.edu/7343>.

Casady et al., "Status of Silicon Carbide (SiC) as a Wide-Bandgap Semiconductor for High-Temperature Applications: A Review," Solid-State Electronics vol. 39, No. 10, pp. 1409-1422, published 1996. Retrieved from the Internet [Jun. 9, 2011] Retrieved from url <http://linkinghub.elsevier.com/retrieve/pii/0038110196000457>.

Liu, "Low temperature synthesis of hexagonal phase ZnS nanocrystals by thermolysis of an air-stable single source molecular precuror in air," Materials Letters 60 (pp. 551-554; published Oct. 6, 2005. Retrieved from the Internet [2011-0609] Retrieved from url <http://linkinghub.elseviercom/retrieve/pii/S0167577X0500916X>.

SensL Corporation Technical Note, "SPM Transimpedence Amplifier", Rev. 1.7., Dec. 2008, 3 pgs. <www.sensl.com/pdfs/SPM_Tech_App_Notes/TN_TIA.pdf>.

Xu et al., "Ultraviolet Communications: Potential and State-of-the-Art" IEEE Communications Magazine, pp. 67-73, May 2008.

U.S. Appl. No. 12/426,740, filed Apr. 20, 2009, Inventors: Peter R. Menge et al., 17 pages.

* cited by examiner

SCINTILLATOR AND DETECTOR ASSEMBLY INCLUDING A SINGLE PHOTON AVALANCHE DIODE AND A DEVICE OF A QUENCHING CIRCUIT HAVING A SAME WIDE BAND-GAP SEMICONDUCTOR MATERIAL

CROSS-REFERENCE TO RELATED APPLICATION(S)

The present application claims priority from U.S. Provisional Patent Application No. 61/185,855, filed Jun. 10, 2009, entitled "Scintillator and Detector Assembly," naming inventor Peter R. Menge, which application is incorporated by reference herein in its entirety.

BACKGROUND

1. Field of the Disclosure

The following is directed to detectors, and particularly detector assemblies incorporating wide band-gap semiconductor materials.

2. Description of the Related Art

Radiation detector devices are used in a variety of industrial applications. Typically, radiation detectors include scintillators made of a material, such as a crystalline material, that is sensitive to a particular type of radiation. For example, certain materials such as sodium iodide are useful for detecting gamma rays. In response to particular types of incident radiation striking the scintillator, particular wavelengths of radiation are reemitted or fluoresced by the scintillator (i.e., radiation-induced scintillation light) and can be transmitted to a light-sensing device, such as a photomultiplier tube. The photomultiplier tube converts the light photons emitted from the crystal into electrical pulses. The electrical pulses are shaped and digitized by associated electronics and may be registered as counts that are transmitted to analyzing equipment.

Scintillation detectors are useful in various industrial applications including for example, well logging, since measurements of radiation surrounding a bore hole allow observation of particular types of rock strata. Scintillation detectors can be used in drilling apparatuses themselves, giving rise to the common practice of measurement while drilling (MWD) (or logging while drilling). Nonetheless, MWD applications often take place in severe environments characterized by large amounts of heat, vibration, and shock, which impact detector durability and accuracy.

Accordingly, the industry continues to need improvements in radiation detector devices.

SUMMARY

According to one aspect, a detector is described that includes a photodetector comprising a single photon avalanche diode (SPAD), wherein the SPAD includes a wide band-gap semiconductor material, and a quenching circuit electrically coupled to the photodetector comprising a first device. The first device includes a wide band-gap semiconductor material having a band-gap of at least about 1.7 eV at about 26° C.

Another aspect describes a detector including a housing, a scintillator contained within the housing, and a photodetector contained within the housing and optically coupled to the scintillator, the photodetector comprising a single photon avalanche diode (SPAD) comprising a wide band-gap semiconductor material selected from the group consisting of SiC, GaN, GaAs, AlN, AlAs, BN, GaP, AlP, ZnTe, MnTe, MgTe, ZnS, MgS, HgS, $PbI_2$, $TlPbI_3$, TlBr, TlBrI, InAlP. The detector also includes a quenching circuit electrically coupled to the photodetector having a first device, wherein the first device comprises a wide band-gap semiconductor material selected from the group consisting of SiC, GaN, GaAs, AlN, AlAs, BN, GaP, AlP, ZnTe, MnTe, MgTe, ZnS, MgS, HgS, $PbI_2$, $TlPbI_3$, TlBr, TlBrI, InAlP, and a combination thereof.

In other aspects provided herein, a detector is described that includes a photodetector having an array of single photon avalanche diodes (SPADs), wherein each of the SPADs comprise a wide band-gap semiconductor material. The detector further includes a quenching circuit electrically coupled to the photodetector having a first transistor having a first current electrode electrically coupled to a control electrode of a second electrode, wherein the first transistor and the second transistor comprises a same wide band-gap semiconductor material as the SPADs of the photodetector. A calibration module can be included within the detector that is electrically coupled to the photodetector, the calibration module comprising a SPAD including a wide band-gap semiconductor material.

According to another aspect, a detector is described that includes a photodetector comprising a single photon avalanche diode (SPAD), wherein the SPAD comprises a wide band-gap semiconductor material, and a quenching circuit electrically coupled to the photodetector comprising a first device including a same wide band-gap semiconductor material as the SPAD of the photodetector. The detector can further include a calibration module electrically coupled to the quenching circuit and contained in a dark box separate from the photodetector, wherein the calibration module comprises a calibration SPAD including a wide band-gap semiconductor material.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following is directed to a detector suitable for use in industrial applications, particularly well-logging applications, wherein sensitive components are exposed to extreme environmental conditions including repetitive mechanical shocks and high temperatures. In particular, the detectors described herein incorporate a combination of components making the detector capable of improved responsiveness and accuracy, while also suitably ruggedized for use in industrial applications.

Figure 1A:
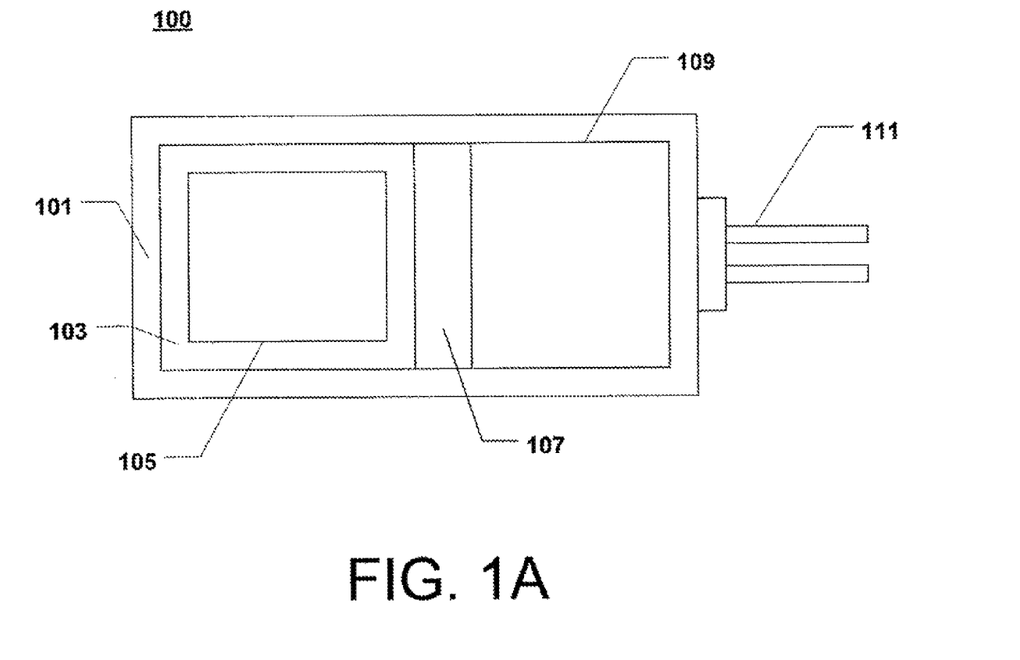
FIG. 1A includes an illustration of a detector in accordance with an embodiment.

FIG. 1A includes a cross-sectional illustration of a detector in accordance with an embodiment. As illustrated, the detector 100 includes a housing 101, that includes a scintillator 105 contained within a casing 103 also contained within the housing 101. The scintillator 105 can be optically coupled to a photodetector 109 via a light pipe 107. Additionally, the photodetector 109 can have electrical contacts 111 extending from the housing 101 configured to electrically couple the photodetector 109 with other electronics for signal processing.

Generally, the housing 101 can be made of a metal material having sufficient strength and toughness to withstand mechanical shocks and temperatures experienced in industrial applications. For example, the housing 101 can be made of metals such as aluminum, iron, titanium, nickel, tungsten, cobalt and alloys including such metals.

The scintillator 105 can be contained within a casing 103, and in particular, can be sealed within the casing 103 such that the environment within the casing 103 is controlled. A sealed casing may be particularly suitable wherein the scintillator 105 is a particularly sensitive material. The assembled casing 103 can be appropriately shield the scintillator 105 from mechanical shocks. Ruggedized casing designs can include the use of shock absorbing materials and biasing members to suitably place the scintillator 105 within the casing 103. For instance, in certain designs, biasing members (not shown) can be disposed at the ends of housing 101 or within the casing 103 to act on the scintillator 105 to bias the position of the scintillator 105 against the light pipe 107 for proper optical coupling. As will be appreciated, the biasing members can be used in conjunction with other known coupling methods such as the use of an optical gel or bonding agent. Such biasing members may also facilitate absorption of shocks to the detector 100 which can reduce false readings and counts during use of the device.

For example, the casing 103 can include a shock absorbing member substantially surrounding the scintillator crystal 105 to reduce mechanical stress to the crystal material during vibrations. The shock absorbing member can surround and exert a radial force on the scintillator crystal 105, and can be made of a resiliently compressible material and according to one embodiment, is a polymer, such as an elastomer.

Additionally, the scintillator crystal 105 can be substantially surrounded by a reflector within the casing to improve the capture of fluoresced radiation by the photodetector 109. The reflector can incorporate materials such as a powder, foil, metal coating, or polymer coating. In certain designs, the reflector is a layer of aluminum oxide (alumina) powder or a polytetrafluoroethylene (PTFE) material.

The scintillator 105 can be a material that is sensitive to radiation, such that when a particular type of incident radiation (e.g., x-rays, gamma rays, neutrons, etc.) interacts with the scintillator material, the scintillator 105 fluoresces radiation of a particular wavelength in response to absorbing the incident radiation. The fluoresced radiation given off by the scintillator 105 can be detected by the photodetector 109. Accordingly, capturing the fluoresced radiation at the photodetector 109 facilitates logging and characterization of radiation within an environment, such as a down-hole well-logging environment.

According to one embodiment, the scintillator 105 can be made of an inorganic material or organic material. The scintillator 105 can be a solid or liquid material. Notably, certain designs utilize a solid inorganic scintillator 105. Suitable inorganic materials can include compounds such as oxides and halides. In particular instances, the scintillator 105 includes a material that is crystalline. For example, particularly suitable crystalline inorganic materials can include CsF, NaI, LaCl$_3$, LaBr$_3$, BGO (e.g., Bi$_4$Ge$_3$O$_{12}$), CaF$_2$, LYSO (e.g., Lu$_{1.8}$Y$_{0.2}$SiO$_5$), LSO (e.g., Lu$_2$SiO$_5$), CsI, LuI$_3$, GSO (i.e. Gd$_2$SiO$_5$), CLYC (e.g. Cs$_2$LiYCl$_6$), CNLI (e.g. Cs$_2$NaLaI$_6$), CLLB (e.g. Cs$_2$LiLaBr$_6$), LuAP (e.g. LuAlO$_3$), LuYAP (e.g. Lu$_x$Y$_{1-x}$AlO$_3$), LuAG (e.g. Lu$_3$Al$_5$O$_{12}$), LPS (e.g. Lu$_2$Si$_2$O$_7$), GdI$_3$, SrI$_2$, and combinations thereof.

For certain detectors, it is suitable that the scintillator 105 include a material designed to fluoresce at a particular wavelength such that the particular components of the photodetector 109 can detect the fluoresced radiation. For example, in one embodiment, the scintillator 105 includes a material that fluoresces at a wavelength of not greater than about 2 microns. In other embodiments, the wavelength of fluoresced radiation from the scintillator 105 can be not greater than about 1 micron, not greater than about 0.8 microns, not greater than about 0.5 microns, or even not greater than about 0.3 microns. In accordance with one particular embodiment, the scintillator 105 includes a material configured to fluoresce at a wavelength within a range between about 2 microns and about 100 nanometers (0.1 microns). In other embodiments, the scintillator material can fluoresce at a wavelength within a range between about 0.6 microns and about 0.2 microns.

Where used, a light pipe 107 disposed between the scintillator 105 and photodetector 109 can include a material suitable for transmitting the fluoresced radiation from the scintillator 105 to the photodetector 109. Plastic material such as Lucite may be used as the light pipe, or alternatively, a glass material, or even a crystalline material, such as sapphire. Certain designs may use a transparent (to the fluoresced radiation at least) silicone rubber material suitable for use in high temperatures, including for example, temperatures as great as 250° C.

The photodetector 109 can be disposed within the housing 109 and optically coupled to the scintillator 105. The photodetector 109 is a device intended to detect the radiation fluoresced from the scintillator and convert the photons of fluoresced radiation into an electric signal. In particular, the conversion of the fluoresced radiation into an electric signal can be accomplished using an optoelectronic solid state device known as an avalanche diode that is operated in a particular state referred to as Geiger-mode, such that the device is a single-photon avalanche diode (SPAD). SPADs incorporate layers or regions of a semiconductor material (e.g., p-n junction) that are biased at a voltage that is much greater than the breakdown voltage, such that the impact of a single photon on the device triggers an avalanche of current through the device, thus allowing the device to detect low intensity photon signals with great sensitivity and accuracy. In particular, SPADs differ from traditional avalanche diodes in that such devices are configured to operate with a reverse bias voltage well above the break down voltage contrary to standard avalanche diodes and once the avalanche of current is triggered, such devices require a quenching mechanism to lower the bias voltage below the breakdown voltage to reset the device for detection of the next photon.

Figure 1B:
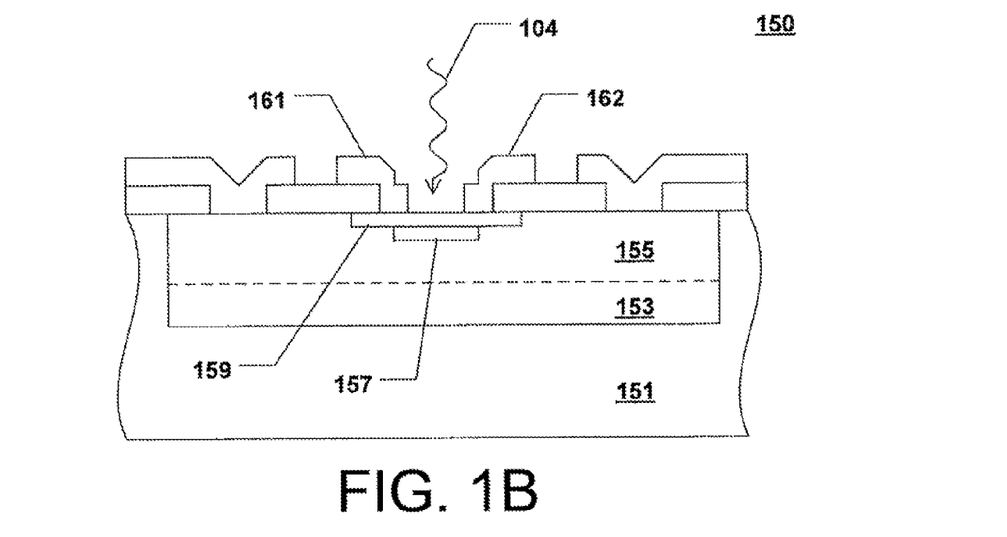
FIG. 1B includes a cross-sectional illustration of a single photon avalanche diode (SPAD) device in accordance with an embodiment.

FIG. 1B includes a cross-sectional illustration of a SPAD in accordance with an embodiment. As illustrated the SPAD 150 can be formed from a substrate 151 made of a semiconductor material, particularly a wide band-gap semiconductor material. As illustrated, the SPAD can include a substrate having regions 153, 155, 157, and 159 that include particular concentrations and types of dopants to form the p-n junction between regions 157 and 159. In particular embodiments, the semiconductor substrate 151 can be a generally n-type doped material. Region 153 can be a p+ (heavily doped with p-type dopants) region, region 155 can be a p-type doped region, region 157 can be a p+ type doped region, and region 159 can be a n+ (heavily doped with n-type dopants) region. Structures 161 and 162 can be electrical contacts suitable for operating the device. Accordingly, when radiation 104 strikes the region 159 between the structures 161 and 162, the SPAD 150 generates the avalanche current.

In accordance with a particular embodiment, the photodetector includes a SPAD or array of SPADs, wherein each of the SPADs are made of a wide-band-gap semiconductor material. The use of SPADs having wide-band-gap semiconductor materials facilitates the use of a detector in industrial applications. Some suitable wide band-gap semiconductor materials having a band-gap of at least about 1.7 eV at about 26° C. (300 K). In fact, in certain designs, the SPAD includes a wide-band-gap semiconductor material having a band gap of at least about 1.9 eV, such as at least about 2.0 eV, at least about 3 eV at about 26° C. Particular embodiments may utilize a SPAD incorporating a wide-band-gap semiconductor material have a band gap within a range between about 1.7 eV and about 5 eV, such as between about 2 eV and about 4.5 eV, or even between about 2.5 and about 4 eV at 26° C.

More particularly, embodiments herein utilize a SPAD including a wide-band-gap semiconductor material having a band-gap of at least 1.2 eV (electron volts) at a temperature of at least 150° C. In some embodiments, the wide band-gap semiconductor material can have a band-gap of at least 1.2 eV at a temperature of at least about 175° C., or even greater temperatures, such as at least about 200° C., and particularly within a range between about 150° C. and about 300° C. Certain wide band-gap semiconductor materials can have a greater band-gap at temperatures of 150° C. or above, for example, a band-gap of at least 2.0 eV, such as at least about 2.2 eV, and particularly within a range between 2.0 and 4.0 eV between about 150° C. and about 300° C.

Suitable wide band-gap materials for use as in the SPAD can include materials consisting of Group IV elements or compounds, Group III-IV compounds, Group II-IV compounds, Group V elements or compounds, and Group VI elements or compounds, and a combination thereof. It will be appreciated that reference to such Groups, is based upon the Periodic Table of Elements as published in the CRC Handbook 81$^{st}$ Edition. Group III corresponds to the column including elements B through Tl, Group IV corresponds to the column including elements C through Ph, Group V includes elements corresponding to the column including elements N through Bi, and Group VI includes elements corresponding to the column including elements O through Po. Particularly suitable wide band-gap semiconductor materials can include elements such as nitrogen, carbon, phosphorous, arsenic, tellurium, sulfur, iodine, and a combination thereof. In particular instances, the wide band-gap semiconductor material can include compounds such as SiC, GaN, AlN, AlAs, GaAs, BN, GaP, AlP, ZnTe, MnTe, MgTe, ZnS, MgS, HgS, $PbI_2$, $TlPbI_3$, TlBr, TlBrI, InAlP, and a combination thereof.

Figure 2:
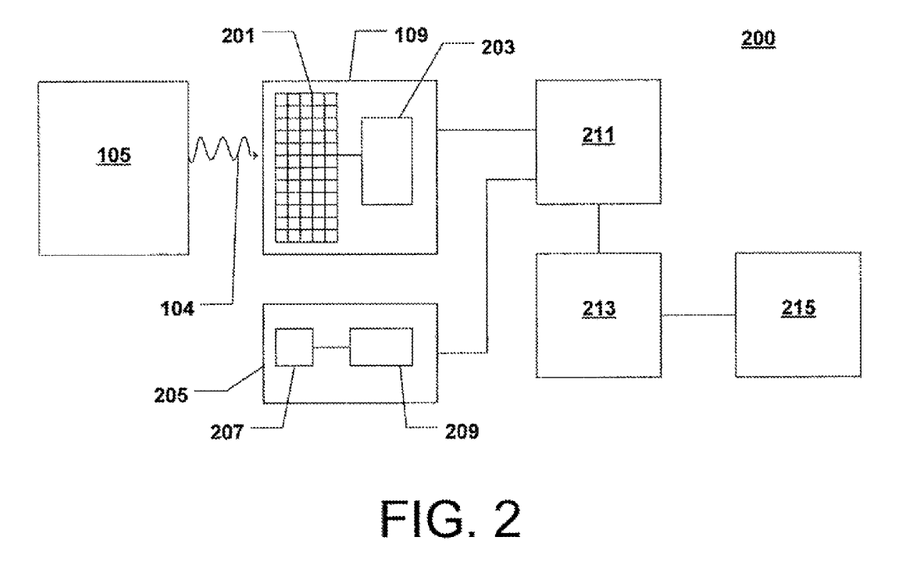
FIG. 2 includes a schematic of a detector in accordance with an embodiment.

FIG. 2 includes a schematic of a detector in accordance with an embodiment. As illustrated, the device 200 includes a scintillator 105 that can emit fluoresced radiation 104 that is detectable by the photodetector 109. The photodetector 109 can be electrically coupled to a converter 211. The device further includes a calibration module 205 electrically coupled to the converter 211. The converter 211 can be electrically coupled to an amplifier 213 for amplification of the signal, and the amplifier 213 can be electrically coupled to a digital signal processing unit 215 for further processing of the digital signal into a user-readable format. Other devices may be coupled to the devices illustrated.

As illustrated, the device 200 can include a photodetector 109 made up of an array of SPADs 201 which are electrically coupled to a quenching circuit 203. During operation, one of more of the SPADs in the array of SPADs 201 can detect the fluoresced radiation 104. At the time a photon strikes a detection surface of the SPAD, the high electric field facilitates acceleration of carriers to impact-ionize with lattice atoms and generate a current. In order to return the SPAD to its original state for detection of the next photon (i.e., a reverse bias well above the breakdown voltage), a quenching circuit 203, and particularly an active quenching circuit, may be used to return the proper bias to the SPAD. Particular devices and configurations for use in the quenching circuit 203 will be described in more detail herein.

Upon generating an electrical signal in response to the fluoresced radiation 104, the signal output from the photodetector 109 can be sent to the converter 211. In particular, the converter 211 can include electronic devices configured to convert the current signal into a voltage-based signal. In accordance with one embodiment, the converter can include an electronic device such as a transimpedance amplifier. Notably, the transimpedance amplifier may include electronic devices including semiconductor materials, and particularly wide band-gap semiconductor materials as described herein.

As further illustrated in FIG. 2, the device 200 can include a calibration module 205. Notably, a calibration SPAD 207 can be contained within the calibration module 205 such that it is isolated and separated from the array of SPADs 201, and particularly contained within a dark box, which is a descriptive term for any environment that it is isolated from radiation that is fluoresced from the scintillator 105 and any radiation incident on the detector device 200. As such, the calibration SPAD 207 can be disposed within a container suitable for isolating the component from radiation fluoresced from the scintillator 105 and is configured to account for only signals that may be generated due to changes in temperature. For example, when the detector is exposed to high temperatures (i.e., greater than 150° C.) the semiconductor material within all of the SPADs in the detector may spawn thermally generated signals. The calibration SPAD 207 is isolated from radiation in a dark box such that any current generated by the calibration SPAD is assumed to be a thermally generated event. During operation, the signal from the calibration module 205 can be compared to the signal from the photodetector 109, and the signal from the photodetector 109 can be processed to remove any thermally generated signals as indicated by the calibration module 205 to reduce false counts (i.e., counts based on thermally generated signals). Such signal processing may be completed by the digital signal processing unit 215.

The calibration SPAD 207 can be electrically coupled to a calibration quenching circuit 209, such that upon generation of a signal, the calibration SPAD 207 can be quenched in a similar manner or the same manner as the SPADs within the array of SPADs 207. As further illustrated, the calibration module 205 is electrically coupled to the converter 211. It will be appreciated that while the calibration SPAD 207 is illustrated as being electrically coupled to an independent and separate quenching circuit 209, in other embodiments the calibration SPAD may be electrically coupled to the quenching circuit 203 of the photodetector 109.

In accordance with an embodiment, the calibration SPAD 207 can include a wide band-gap semiconducting material. In particular, the calibration SPAD 207 can be made of the same wide band-gap semiconductor material as the SPADs within the array of SPADs 201 of the photodetector 109. Making the calibration SPAD 207 and SPADs of the array of SPADs 201 of the same wide band-gap semiconducting material facilitates a consistent change in material properties in response to changing temperatures. As such, the calibration SPAD 207 can have the same response to changing temperatures as the SPADs in the array of SPADs 201, thereby accurately accounting for any thermally generated signals in the array of SPADs 201.

After conversion of the current signal to a voltage signal at the converter 211, the signal can be amplified at the amplifier 213. The amplifier 213 can incorporate one or more electronic devices, which may include a wide band-gap semiconducting material. In particular, use of a wide band-gap semiconducting material within the amplifier 213 facilitates use of the detector in industrial environments. Such wide band-gap semiconducting materials can include those materials previously mentioned. In certain embodiments, the amplifier 213 may incorporate the same wide band-gap semiconducting material as used within the array of SPADs 201 as well as the calibration SPAD 207.

After the signal is amplified at the amplifier 213, the signal can be output to the digital signal processor 215. The digital signal processor 215 converts the amplified voltage output of the amplifier 213 to a user readable format. Moreover, the digital signal processor 215 may be used to calibrate the signal based upon distinctions between the signal generated from the calibration SPAD 207 and any of the individual SPADs of the array of SPADs 201. While illustrated that the signal from the calibration module 205 and photodetector 109 are output to the converter 211, it will be appreciated that other configurations may be used such that proper signal comparison between the calibration module 205 and photodetector 109 are used to account for temperature based fluctuations.

Figure 3:
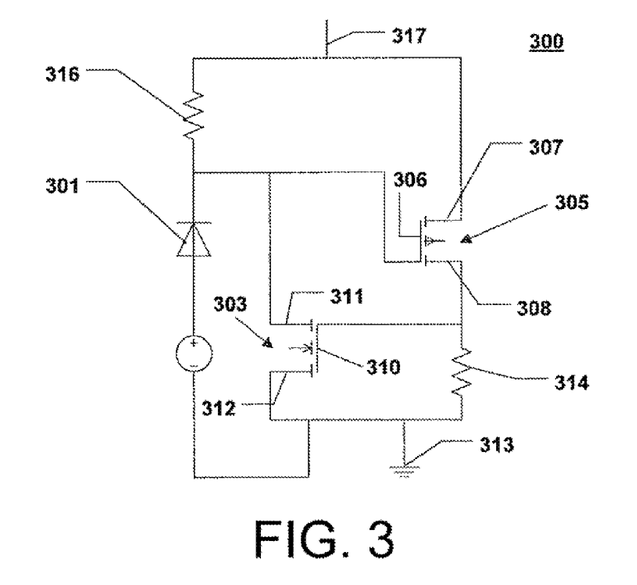
FIG. 3 includes an electrical schematic of a quenching circuit in accordance with an embodiment.

FIG. 3 includes a schematic of a quenching circuit in accordance with an embodiment. As illustrated, the quenching circuit 300 can include a series of devices which are electrically coupled to facilitate active quenching of the SPADs within the photodetector 109, or calibration SPAD 207 within the calibration module 205. In particular, the quenching circuit 300 is designed to quickly return the appropriate bias to the SPAD 301 after generation of a current from interaction with a photon. As illustrated, the SPAD 301 can be electrically coupled to a resistor 316, which can be electrically coupled to an output 317. The SPAD 301 can also be electrically coupled to a first transistor 305 and a second transistor 303. The first transistor 305 can be electrically coupled to the second transistor 303 and a resistor 314, and the resistor 314 can electrically coupled to a voltage reference 313 (i.e., ground). Moreover, the first transistor 305 can be electrically coupled to the resistor 316 and output 317. The second transistor 303 can also be coupled to the voltage reference 313 and the resistor 316.

As illustrated in the quenching circuit 300, the transistors 305 and 303 can be arranged in a particular design. For example, the transistor 305 can have a first current electrode 308, a control electrode 306 and a second current electrode 307. The first current electrode of the transistor 305 can be electrically coupled to the control electrode 310 of the second transistor 303. Moreover, the first current electrode 308 of the first transistor 305 can be electrically coupled to the resistor 314. The second current electrode 307 of the first transistor 305 can be electrically coupled to the output 317. Moreover, the control electrode 306 of the first transistor 305 can be electrically coupled to the output of the SPAD 301 and the resistor 316.

The second transistor 303 can have a first current electrode 311, a control electrode 310, and a second current electrode 312. The second current electrode 312 can be electrically coupled to the control reference 313. The first current electrode 311 of the second transistor 303 can be electrically coupled to the control electrode 306 of the first transistor 305, the output of the SPAD 301 and the resistor 316. In particular, the connection between the first transistor 305 and the second transistor 303 facilitates each of the transistors switching each other on and/or off depending upon the state of the SPAD 301, which in turn facilitates quickly returning the proper voltage bias to the SPAD 301 for detection of a subsequent photon.

In accordance with a particular embodiment, the first transistor 305 can be a first conductivity type and the second transistor 303 can be a second conductivity type. Notably, reference to conductivity types of transistors is reference to n-type or p-type transistors, wherein the semiconductor material contains a p-type or n-type dopant. In one particular embodiment, the first transistor 305 can be a p-type transistor, otherwise a p-type metal oxide semiconductor (PMOS) device and the second transistor 303 can be an n-type transistor, otherwise a n-type metal oxide semiconductor (NMOS) device. Such an arrangement facilitates the transistors switching each other on during quenching conditions.

During operation, the quenching circuit can be in a quiescent state, waiting for a photon to strike the SPAD 301. In such a state, a reverse bias is applied to the SPAD 301 that is much greater than the breakdown voltage of the device. Upon a photon striking the SPAD 301, an avalanche of current is generated. In such a condition, the quenching circuit is turned on, and the current generated facilitates a suitable bias at the control electrode 306 of the first transistor 305, such that the first transistor 305 is turned to an on state, which turns the second transistor 303 to an on state and current flows through both devices 305 and 303 to the control reference 313 (ground). When the current is dissipated, the reverse bias voltage returns to its original state across the SPAD 301 such that the SPAD 301 is capable of detecting another photon.

In accordance with an embodiment, the transistors 305 and 303 can include a wide band-gap semiconductor material as described herein. In particular, the first transistor 305 can incorporate a wide band-gap semiconductor material that is the same as the wide band-gap semiconductor material used in the SPADs of the photodetector 109. Likewise, the second transistor 303 can use the same base type semiconductor material as used in the transistor 305 and SPADs of the photodetector 109. It will be appreciated, however that doping considerations may change the actual numerical value of the band-gap despite the use of the same base semiconductor material.

The quenching circuit 300 can have a quenching time suitable to return the SPAD to a detection state having the appropriate reverse bias before another photon strikes the SPAD. According to one embodiment, the quenching time of the quenching circuit 300 can be not greater than about 250 nanoseconds (ns) at a temperature of at least 150° C. Such a circuit allows for a responsive photodetector in industrial applications. In particular, the quenching time may be less, such that it is not greater than about 200 ns, not greater than 150 ns, not greater than 125 ns, or even not greater than about 100 ns, such as within a range between about 50 ns and 200 ns, at a temperature of at least 150° C., and particularly within a range between about 150° C. and about 300° C.

Moreover, the quenching circuit 300 may use a small number of electronic devices that incorporate a wide band-gap semiconductor material (e.g., transistors) such that changes in temperature and mechanical shocks have less probability of damaging the quenching circuit 300. As such, in accordance with one embodiment, the quenching circuit 300 includes not greater than 3 electronic devices. In other embodiments, the quenching circuit 300 may utilize not greater than 2 electronic devices.

Figure 4:
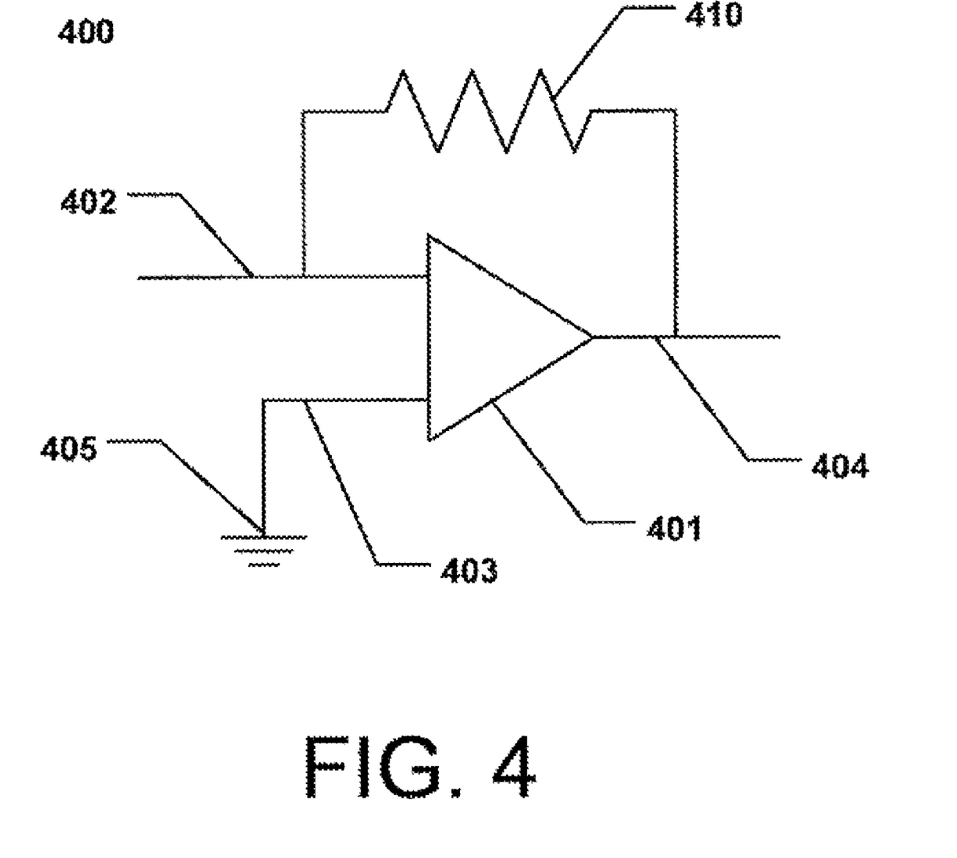
FIG. 4 includes an electrical schematic of a converter in accordance with an embodiment.

As described herein, the device can include a converter suitable for changing a current signal to a voltage signal (See, 213 in FIG. 2). FIG. 4 includes a schematic of converter suitable for use in the device. In particular, the converter 400 can be a transimpedance amplifier that can include an operational amplifier 401. A wide-bandgap semiconductor material can be used in the transistors within the operational amplifier 401 such that the device is particularly suitable for use in the detector device as described herein. The operational amplifier 401 can include a first input 402, a second input 403, and an output 404. As illustrated, the converter 400 can include a resistor 410 that is electrically connected in parallel with the operational amplifier 401, such that a first end of the resistor 410 is connected to the first input 402 and a second end of the resistor 410 is connected to the output 404 of the operational amplifier 401. The second input 403 of the operational amplifier 401 can be connected to a voltage reference 405, such as a ground.

Embodiments herein have described a detector using a combination of components to facilitate operation of the detector in industrial applications. While certain devices have been made that incorporate the use of avalanche photodiodes or SPADs, such devices typically incorporate common semiconductor materials such as silicon or germanium. Unlike the embodiments herein, such devices are not suitable for operation in some industrial applications. However, embodiments herein utilize a photodetector incorporating an array of SPADs made of a wide band-gap semiconductor material combined with a quenching circuit utilizing wide band-gap semiconductor materials, a calibration module including a calibration SPAD, a converter, and an amplifier further incorporating such wide band-gap semiconductor materials making the detector suitable for use in industrial applications.

In the foregoing, reference to specific embodiments and the connections of certain components is illustrative. It will be appreciated that reference to components as being coupled or connected is intended to disclose either direct connection between said components or indirect connection through one or more intervening components to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. A detector comprising:
    a photodetector comprising a single photon avalanche diode (SPAD), wherein the SPAD comprises a wide band-gap semiconductor material; and
    a quenching circuit electrically coupled to the photodetector comprising a first device, wherein the first device comprises a wide band-gap semiconductor material having a band-gap of at least about 1.7 eV at about 26° C.

2. The detector of claim 1, wherein the photodetector comprises an array of SPAD devices.

3. The detector of claim 1, wherein the wide band-gap semiconductor material comprises a band-gap of at least about 1.2 eV at a temperature of at least about 150° C.

4. The detector of claim 1, wherein the wide band-gap semiconductor material comprises a band-gap of at least about 2.0 eV at a temperature of at least about 150° C.

5. The detector of claim 4, wherein the wide band-gap semiconductor material comprises a band-gap within a range between about 2.0 eV and about 4.0 eV at a temperature of at least about 150° C.

6. The detector of claim 1, wherein the wide band-gap semiconductor material of the first device is a same material as the wide band-gap semiconductor material of the SPAD.

7. The detector of claim 1, wherein the wide band-gap semiconductor material of the first device comprises a material selected from the Groups of the Periodic Table of Elements consisting of Group IV elements, Group IV compounds, Group III-V compounds, Group II-VI compounds, and a combination thereof.

8. The detector of claim 1, wherein the first device comprises a device selected from the group of devices consisting of a transistor and a diode.

9. The detector of claim 1, wherein the quenching circuit comprises a second device comprising a wide band-gap semiconductor material.

10. The detector of claim 9, wherein the wide band-gap semiconductor material of the second device is the same as the wide band-gap semiconductor material of the first device.

11. The detector of claim 9, wherein the wide band-gap semiconductor material of the second device is the same as the wide band-gap semiconductor material of the SPAD.

12. The detector of claim 1, wherein the quenching circuit has a quenching time of not greater than about 200 ns at a temperature of at least about 150° C.

13. The detector of claim 1, further comprising an amplifier device electrically connected to the photodetector.

14. The detector of claim 13, wherein the amplifier device comprises at least one electronic device comprising a wide band-gap semiconductor material.

15. A detector comprising:
    a photodetector comprising an array of single photon avalanche diodes (SPADs), wherein each of the SPADs comprise a wide band-gap semiconductor material;
    a quenching circuit electrically coupled to the photodetector comprising a first transistor having a first current electrode electrically coupled to a control electrode of a second transistor, wherein the first transistor and the second transistor comprise a same wide band-gap semiconductor material as the SPADs of the photodetector; and
    a calibration module electrically coupled to the photodetector, the calibration module comprising a SPAD including a wide band-gap semiconductor material.

16. The detector of claim 15, wherein the SPAD of the calibration module comprises a same wide band-gap semiconductor material as the SPADs of the photodetector.

17. The detector of claim 15, wherein the first transistor has a first conductivity type and the second transistor comprises a second conductivity type different than the first conductivity type.

18. The detector of claim 15, wherein the quenching circuit further comprises a first resistor electrically coupled to the first transistor and the second transistor.

19. The detector of claim 15, wherein the quenching circuit further comprises a second resistor electrically coupled to the first transistor and the second transistor.

20. A detector comprising:
- a photodetector comprising a single photon avalanche diode (SPAD), wherein the SPAD comprises a wide band-gap semiconductor material;
- a quenching circuit electrically coupled to the photodetector comprising a first device including a same wide band-gap semiconductor material as the SPAD of the photodetector; and
- a calibration module electrically coupled to the quenching circuit and contained in a dark box separate from the photodetector, wherein the calibration module comprises a calibration SPAD including a wide band-gap semiconductor material.

* * * * *